United States Patent
Yu

(10) Patent No.: US 9,651,815 B2
(45) Date of Patent: May 16, 2017

(54) SELF-CAPACITANCE IN-CELL TOUCH SCREEN AND METHOD OF MANUFACTURING THE SAME, LIQUID CRYSTAL DISPLAY

(71) Applicant: Wuhan China Star Optoelectronics Technology Co., Ltd., Wuhan, Hubei (CN)

(72) Inventor: Xiaojiang Yu, Hubei (CN)

(73) Assignee: WUHAN CHINA STAR OPTOELECTRONICS TECHNOLOGY CO., LTD., Wuhan Hubei (CN)

( * ) Notice: Subject to any disclaimer, the term of this patent is extended or adjusted under 35 U.S.C. 154(b) by 132 days.

(21) Appl. No.: 14/761,857

(22) PCT Filed: Jun. 8, 2015

(86) PCT No.: PCT/CN2015/081013
§ 371 (c)(1),
(2) Date: Jul. 17, 2015

(87) PCT Pub. No.: WO2016/192121
PCT Pub. Date: Dec. 8, 2016

(65) Prior Publication Data
US 2017/0010493 A1 Jan. 12, 2017

(30) Foreign Application Priority Data
May 29, 2015 (CN) .......................... 2015 1 0290262

(51) Int. Cl.
*G06F 3/045* (2006.01)
*G02F 1/1333* (2006.01)
(Continued)

(52) U.S. Cl.
CPC ........ *G02F 1/13338* (2013.01); *G02F 1/1333* (2013.01); *G02F 1/1368* (2013.01); *G02F 1/13439* (2013.01); *G02F 1/133345* (2013.01); *G02F 1/133514* (2013.01); *G06F 3/044* (2013.01); *G06F 3/0412* (2013.01); *G06F 3/0416* (2013.01); *G02F 2001/133302* (2013.01); *G02F 2001/133357* (2013.01); *G02F 2201/123* (2013.01); *G06F 2203/04103* (2013.01); *G06F 2203/04104* (2013.01); *G06F 2203/04111* (2013.01)

(58) Field of Classification Search
CPC ...... G06F 3/0412; G06F 3/0416; G06F 3/044; G06F 2203/04103; G02F 1/13338;
(Continued)

(56) References Cited

U.S. PATENT DOCUMENTS

2011/0157762 A1* 6/2011 Kurashima ............. G06F 3/044
361/277
2011/0316427 A1* 12/2011 Okajima ................. G06F 3/042
315/151
(Continued)

*Primary Examiner* — Joe H Cheng
(74) *Attorney, Agent, or Firm* — Brooks Kushman P.C.

(57) ABSTRACT

A self-capacitance in-cell touch screen including a glass array substrate, thin film transistors disposed on the substrate, and pixel electrodes electrically connected with the thin film transistors, a planarizing layer between the pixel electrodes and the thin film transistors. The transparent touch control sensing electrode, a first insulation layer, a second insulation layer, and a metal connection line are disposed on the planarizing layer in sequence. The metal connection line is electrically connected to the touch control sensing electrode through via holes. The first insulation layer is between the planarizing layer and the pixel electrode, and the second insulation layer is located on the pixel electrode. The touch control sensing electrodes are common electrodes to transfer a common voltage and a touch scan signal by time-sharing during a period of displaying one frame image. A method of manufacturing self-capacitance in-cell touch screens and a liquid crystal displays is also disclosed.

17 Claims, 2 Drawing Sheets

(51) Int. Cl.
*G06F 3/044* (2006.01)
*G02F 1/1335* (2006.01)
*G02F 1/1343* (2006.01)
*G02F 1/1368* (2006.01)
*G06F 3/041* (2006.01)

(58) Field of Classification Search
CPC ......... G02F 1/133345; G02F 1/133514; G02F 2001/133357; G02F 2201/123
See application file for complete search history.

(56) References Cited

U.S. PATENT DOCUMENTS

| | | | |
|---|---|---|---|
| 2012/0249454 A1* | 10/2012 | Teraguchi | G06F 3/0412 345/173 |
| 2014/0152619 A1* | 6/2014 | Hotelling | G09G 3/3648 345/174 |
| 2014/0375910 A1* | 12/2014 | Tada | G06F 3/044 349/12 |
| 2015/0034918 A1* | 2/2015 | Yim | H01L 51/56 257/40 |
| 2015/0042903 A1* | 2/2015 | Misaki | G06F 3/044 349/12 |
| 2015/0162389 A1* | 6/2015 | Zhang | H01L 51/5206 257/40 |
| 2016/0018935 A1* | 1/2016 | Wei | G06F 3/044 345/173 |
| 2016/0124280 A1* | 5/2016 | Park | G02F 1/136286 349/43 |
| 2016/0180781 A1* | 6/2016 | Kim | G06F 3/0416 345/212 |
| 2016/0320650 A1* | 11/2016 | Ding | G02F 1/13338 |

* cited by examiner

SELF-CAPACITANCE IN-CELL TOUCH SCREEN AND METHOD OF MANUFACTURING THE SAME, LIQUID CRYSTAL DISPLAY

CROSS-REFERENCE TO RELATED APPLICATION

This application is the U.S. national phase of PCT Application No. PCT/CN2015/081013 filed on Jun. 8, 2015, which claims priority to CN Patent Application No. 201510290262.0 filed on May 29, 2015, the disclosures of which are incorporated in their entirety by reference herein.

BACKGROUND

Technical Field

The present disclosure relates to the touch control field, more particularly, to a self-capacitance in-cell touch screen and a method of manufacturing the same, and it also relates to a liquid crystal display including the in-cell touch screen.

Background Art

As an input media, a touch display screen is the simplest and most convenient human-machine interaction means, and thus, the touch display is more and more widely used in various electronic products. Based on different operation theories and media for transmitting information, the touch screen products are classified into four types: infrared touch screens, capacitance touch screens, resistance touch screens, and surface acoustic wave (SAW) touch screens, wherein the capacitance touch screens become the main-stream touch screen technique nowadays due to the advantages such as long life, high light transmittance, supporting multi-point touch control, etc. The capacitance touch screens include surface capacitance type and projective capacitance type, wherein the projective capacitance touch screens further include self-capacitance type and mutual capacitance type. Regarding self-capacitance touch structure, since the accuracy and signal-noise ratio of the touch induction thereof are higher, it is preferred by various panel factories.

At present, the self-capacitance touch structure realizes the function of detecting a position touched by a finger according to a self-capacitance theory with the details as follows: a plurality of touch control sensing electrodes are disposed in the touch screen structure, the capacitance sensed by respective touch sensing electrodes are a constant value when a human body does not touch the screen, while when the human body touches the screen, the capacitance sensed by the touch sensing electrode at the touched position is influenced by the human body, and a touch control detection chip may determine a touch-control position by detecting capacitance value changes of respective touch control sensing electrodes during a touch control period.

FIG. 1 is a schematic view illustrating an electrode distribution of existing self-capacitance touch screen structure. As shown in FIG. 1, the self-capacitance touch screen structure includes an touch control sensing electrode 7 arranged in array, each of which requires to be connected with the touch control detection chip (not shown) through a separated metal connection line 5. The touch sensing electrode 7 and the metal connection line 5 are disposed on different layers with insulation layers (not shown) isolating them, and the touch sensing electrode 7 are electrically connected with corresponding metal connection line 5 through a via hole. In particular, regarding a column of touch control sensing electrodes, each metal connection line is not connected to a front touch control sensing electrode before being connected to corresponding touch control sensing electrode, and not connected to a rear touch control sensing electrode after being connected to the corresponding touch control sensing electrode.

In the self-capacitance in-cell touch screen, the touch control sensing electrode and the metal connection line in the touch screen structure are commonly directly disposed on an array substrate or a color filter substrate. FIG. 2 is a local structural schematic view illustrating an array substrate having the touch screen structure. As shown in FIG. 2, the array substrate includes a glass substrate 1, a thin film transistor 2 disposed on the glass substrate 1, a pixel electrode 3 electrically connected to the thin film transistor 2, and a planarizing layer 4 interposed between the pixel electrode 3 and the thin film transistor 2. The touch screen structure is disposed on the planarizing layer with the details as follows: firstly, the metal connection line 5 is formed on the planarizing layer 4; then a first insulation layer 6 is covered on the metal connection line 5; the touch control sensing electrode 7 is further disposed on the first insulation layer 6 and is electrically connected to the metal connection line 5 through the via hole; and finally, a second insulation layer 8 is covered on the touch control sensing electrode 7. The first and second insulation layers 6 and 8 are interposed between the planarizing layer 4 and the pixel electrode 3 in sequence. The pixel electrode 3 is electrically connected to the thin film transistor 2 (i.e., connected to a source electrode or a drain electrode of the thin film transistor 2) though via holes disposed in the planarizing layer 4, and the first and second insulation layers 6 and 8. The touch control sensing electrode 7 is further configured as a common electrode to transfer a common voltage (Vcom) and a touch scan signal by time-sharing during a period of displaying one frame image.

In the array substrate with the above structure, the planarizing layer 4 is made of an organic material, and the metal connection line 5 is made of a metal material. When manufacturing the metal connection line 5 on the planarizing layer 4 by using a deposition process, the high temperature in the deposition process may cause the planarizing layer 4 to give off gases, while since the metal connection line 5 has a relatively small width and a relatively great thickness, the adhesion between metal connection line 5 and the planarizing layer 4 may be weak, which may be easy to cause the defect of falling off, resulting in an influence on the quality of the product.

SUMMARY

As for the disadvantages in the prior art, the present disclosure provides a self-capacitance in-cell touch screen. Through improving a touch screen structure disposed in an array substrate, an adhesion between the touch screen structure and the array substrate is enhanced, thereby improving the quality of the products while reducing the production cost.

In order to achieve the above purpose, the technical solution applied in the present disclosure is as follows:

a self-capacitance in-cell touch screen including an array substrate which has a glass substrate, thin film transistors disposed on the glass substrate, and pixel electrodes electrically connected with the thin film transistors, a planarizing layer being disposed between the pixel electrodes and the thin film transistors, wherein a transparent touch control sensing electrode, a first insulation layer, a second insulation layer, and a metal connection line are disposed on the planarizing layer in sequence, and the metal connection line is electrically connected to the touch control sensing electrode through via holes disposed in the first insulation layer and the second insulation layer; wherein the first insulation layer extends to a position between the planarizing layer and the pixel electrode, and the second insulation layer extends to be located on the pixel electrodes which are electrically connected to the thin film transistors through via holes disposed in the first insulation layer and the planarizing layer; and wherein the touch control sensing electrode is further configured as a common electrode to transfer a common voltage and a touch scan signal by time-sharing during a period of displaying one frame image.

Each of the touch control sensing electrode and the pixel electrode is made of ITO, the planarizing layer is made of an organic material, and the metal connection line is made of a metal material.

Each of the first and second insulation layers is made of $SiN_x$, $SiO_x$, or $SiN_xO_y$.

each of the thin film transistors include a source electrode, a drain electrode, a gate electrode, and an active layer, wherein the active layer is disposed on and connected to the glass substrate; the source and drain electrodes are disposed on the same layer above the active layer; the gate electrode is above the source electrode and the drain electrode; a third insulation layer is disposed between the source and drain electrodes and the active layer; the source and drain electrodes are connected to the active layer through via holes disposed in the third insulation layer, respectively; and a fourth insulation layer is disposed between the source and drain electrodes and the gate electrode.

An ohmic contact layer is disposed between the active layer and the source and drain electrodes.

Each of the third and fourth insulation layers is made of $SiN_x$, $SiO_x$, or $SiN_xO_y$.

The self-capacitance in-cell touch screen further includes a color filter substrate disposed opposite to the array substrate and a liquid crystal layer interposed between the array substrate and the color filter substrate.

The manufacturing method of the self-capacitance in-cell touch screen as provided above includes the steps for manufacturing the array substrate, wherein the manufacturing process of the array substrate includes:

S10, providing a glass substrate and manufacturing thin film transistors on the glass substrate;

S20, forming a planarizing layer on the glass substrate having the thin film transistors;

S30, forming a transparent touch control sensing electrodes on the planarizing layer;

S40, forming a first insulation layer on the planarizing layer having the touch control sensing electrode;

S50, disposing a first via hole in the portion of the first insulation layer and the planarizing layer corresponding to the thin film transistors;

S60, forming a pixel electrode on the first insulation layer, the pixel electrode being electrically connected to the thin film transistors through the first via hole;

S70, forming a second insulation layer on the first insulation layer having the pixel electrode and disposing a second via hole in the portion of the first and second insulation layers corresponding to the touch sensing electrode; and S80, forming a metal connection line on the second insulation layer, the metal connection line being electrically connected to the touch sensing electrode through the second via hole.

The other aspect of the present disclosure is providing a liquid crystal display including a liquid crystal display screen and a back light module disposed opposite to the liquid crystal display screen, wherein the back light module provides the liquid crystal display screen with a light source for displaying image, and the liquid crystal display screen uses the self-capacitance in-cell touch screen as mentioned above.

In the self-capacitance in-cell touch screen provided in an embodiment of the present disclosure, a touch screen structure is disposed in the array substrate having the in-cell touch screen including the touch control sensing electrode, the first insulation layer, the second insulation layer, and the metal connection line formed on the planarizing layer in sequence. Since the touch control sensing electrode has greater width and smaller thickness compared with the metal connection line, gases given off by the planarizing layer due to high temperature in the deposition process have less influences on the adhesion between the touch control sensing electrode and the planarizing layer, which resolves the problem of weak adhesion occurring when the metal connection line is prior manufactured in the prior art, thereby improving the quality of the product and reducing the production cost. In addition, the second insulation layer also isolates the metal connection line from the pixel electrode and thus avoiding occurrence of short circuit between the metal connection line and the pixel electrode.

DETAILED DESCRIPTION OF EXEMPLARY EMBODIMENTS

Hereafter, the technical solutions in embodiments of the present disclosure will be described in details in conjunction with the figures illustrating the embodiments of the present disclosure. Apparently, the described embodiments are only a part of the embodiments rather than all of them. Based on the described embodiments of the present disclosure, all other embodiments which can be obtained by those skilled in the art without any creative effort are included within the protection scope of the present disclosure.

Figure 1:
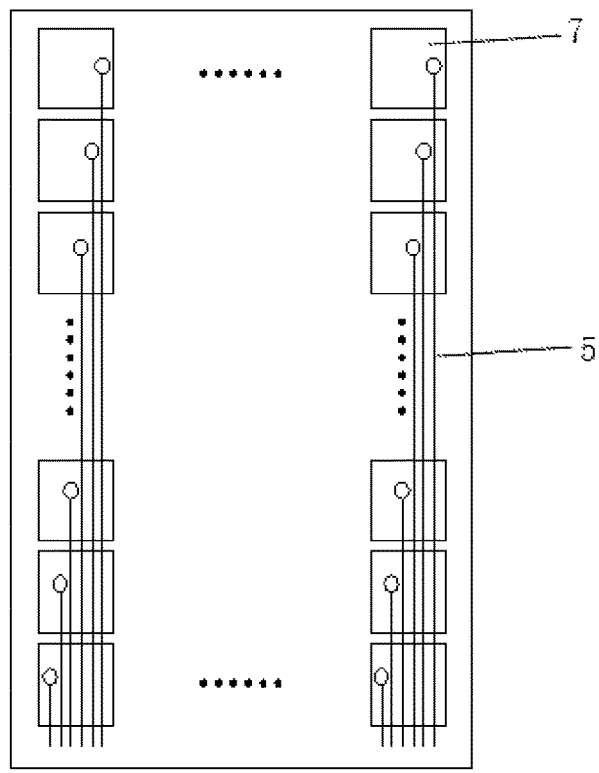
FIG. 1 is a schematic view illustrating an electrode distribution of existing self-capacitance touch screen structure.
Figure 2:
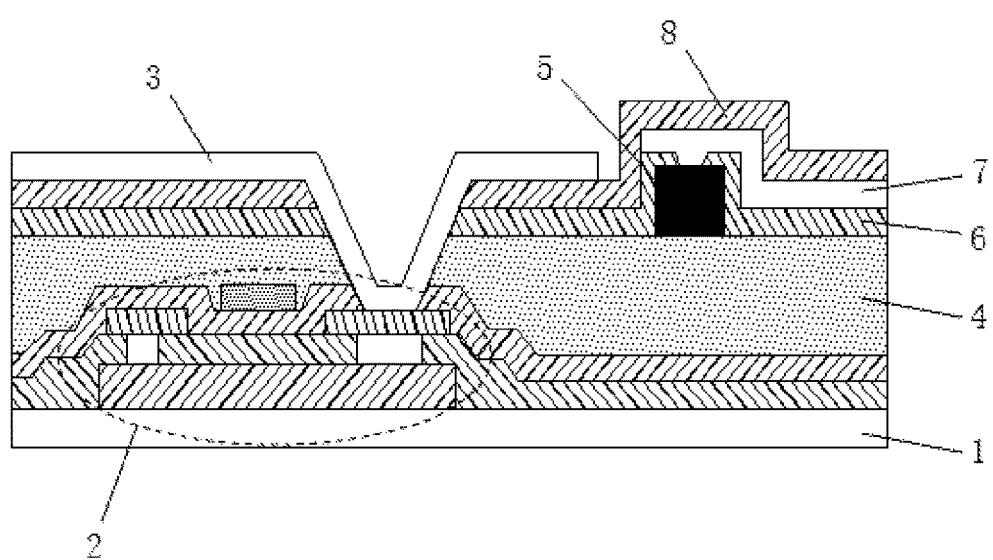
FIG. 2 is a local structural schematic view illustrating an array substrate having the touch screen structure.
Figure 3:
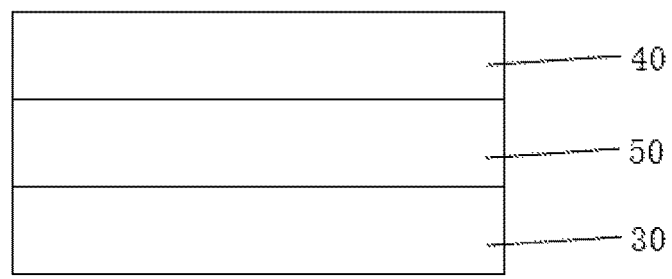
FIG. 3 is a schematic view illustrating the structure of a capacitance in-cell touch screen provided by an embodiment of the present disclosure.

Firstly, an embodiment of the present disclosure provides a self-capacitance in-cell touch screen. As illustrated in FIG. 3, the self-capacitance in-cell touch screen includes an array substrate 30 and a color filter substrate 40 disposed opposite to each other and a liquid crystal layer 50 interposed therebetween. The touch screen structure is embedded into the array substrate 30.

Figure 4:
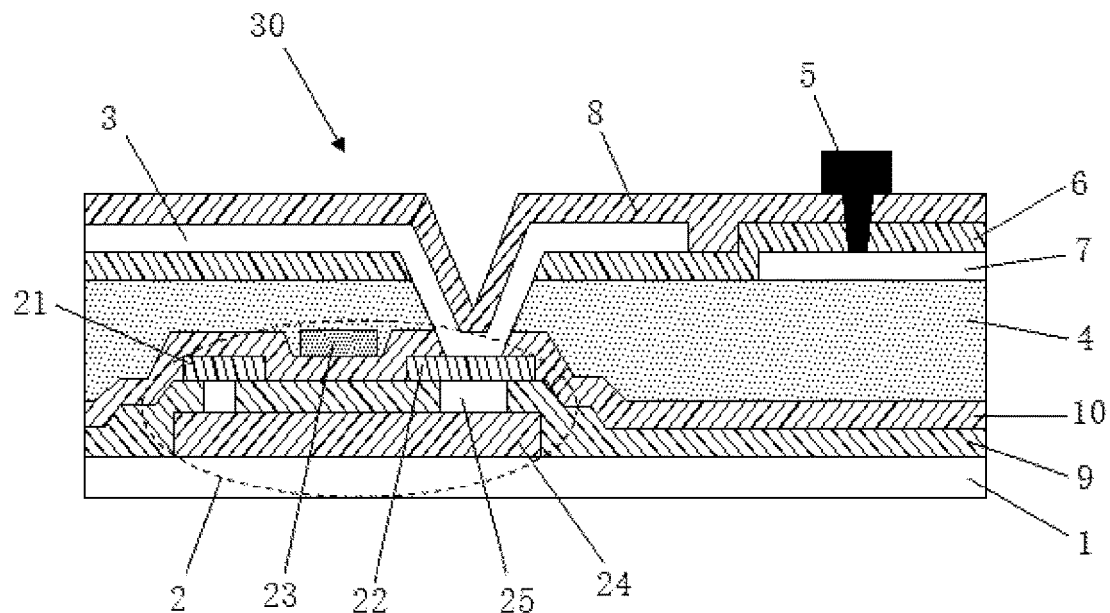
FIG. 4 is a local structural schematic view illustrating an array substrate having the touch screen structure provided by an embodiment of the present disclosure.

In particular, as illustrated in FIG. 4, the array substrate 30 includes a glass substrate 1 and a thin film transistor 2 disposed on the glass substrate 1, wherein a planarizing layer 4 is disposed on the thin film transistor 2. A pixel electrode 3 and the touch screen structure are respectively disposed on the planarizing layer 4 and insulated from each other. In particular, the touch screen structure includes a touch control sensing electrode 7 and a metal connection line 5 disposed on different layers which is manufactured by following steps: firstly, the touch control sensing electrode 7 is formed on the planarizing layer 4 by a deposition process, then a first insulation layer 6 and a second insulation layer 8 are disposed on the touch control sensing electrode 7 in sequence, and at last, the metal connection line 5 is disposed on the second insulation layer 8, wherein the metal connection line 5 is electrically connected to the touch control sensing electrode 7 through via holes in the first and second insulation layers 6 and 8. Further, the first insulation layer 6 extends to a position between the planarizing layer 4 and the pixel electrode 3, and the second insulation layer 8 extends to be located on the pixel electrode 3. The pixel electrode 3 is electrically connected to the thin film transistor 2 (i.e., connected to a source electrode or a drain electrode of the thin film transistor 2) through via holes disposed in the first insulation layer 6 and the planarizing layer 4. The second insulation layer 8 function as insulating the metal connection line 5 from the pixel electrode 3 to avoid an occurrence of short circuit between the metal connection line 5 and the pixel electrode 3. Furthermore, the touch control sensing electrode 7 is further configured as a common electrode to transfer a common voltage (Vcom) and a touch scan signal by time-sharing during a period of displaying one frame image.

The touch control sensing electrode 7 and the pixel electrode 3 are made of transparent conductive materials, for example, ITO may be selected. The material forming the planarizing layer may be an organic material, and the material forming the metal connection line 5 may be a metal material, which may be composed of a multi-layered metal material, for example, a three-layered metal material including Mo/Al/Mo in sequence.

In the array substrate with the structure mentioned above, the touch screen structure therein includes the touch control sensing electrode 7, the first insulation layer 6, the second insulation layer 8, and the metal connection line 5 formed on the planarizing layer 4 in sequence. Since the touch control sensing electrode 7 has greater width and smaller thickness compared with the metal connection line 5, gases given off by the planarizing layer 4 due to high temperature in the deposition process have less influences on the adhesion between the touch control sensing electrode 7 and the planarizing layer 4, which resolves the problem of weak adhesion occurring when the metal connection line 5 is prior manufactured in the prior art, thereby improving the quality of the product and reducing the production cost.

As illustrate in FIG. 4, the thin film transistor 2 includes a source electrode 21, a drain electrode 22, a gate electrode 23, and an active layer 24, wherein the active layer 24 is disposed on the glass substrate 1, the source and drain electrodes 21 and 22 are disposed on the same layer above the active layer 24, and the gate electrode 24 is located above the source and drain electrodes 21 and 22. A third insulation layer 9 is disposed between the source and drain electrodes 21 and 22 and the active layer 24. The source and drain electrodes 21 and 22 are connected to the active layer 24 through via holes disposed in the third insulation layer 9, respectively. A fourth insulation layer 10 is disposed between the source and drain electrodes 21 and 22 and the gate electrode 23. The pixel electrode 3 is electrically connected to the drain electrode 22 of the thin film transistor 2 though via holes disposed in the first insulation layer 6 and the planarizing layer 4.

Furthermore, in order to ensure good electrical contacts between the source and drain electrodes 21 and 22 and the active layer 24, an ohmic contact layer 25 having a specific material of N+Si is further disposed between the active layer 24 and the source and drain electrodes 21 and 22.

Moreover, in this embodiment, the material forming of the first and second insulation layers 6 and 8 may be selected as $SiN_x$, $SiO_x$, or $SiN_xO_y$; and the material forming of the third and fourth insulation layers 9 and 10 may also be selected as $SiN_x$, $SiO_x$, or $SiN_xO_y$.

More particularly, the manufacturing process of the array substrate mainly includes the following steps S10, S20, S30, S40, S50, S60, S70 and S80.

In the step of S10, a glass substrate 1 is provided and a thin film transistor 2 is formed on the glass substrate 1.

In the step of S20, a planarizing layer 4 is formed on the glass substrate 1 having the thin film transistor.

In the step of S30, a transparent touch control sensing electrode 7 is formed on the planarizing layer 4, wherein, firstly, a thin film layer to be formed as the touch control sensing electrode 7 is formed on the planarizing layer 4 by a deposition process; and then a patterned touch control sensing electrode 7 is obtained through a photoetching process. More particularly, since the touch control sensing electrode 7 is configured as a common electrode, the manufacturing process of this step may also be construed as follows: firstly, a thin film to be formed as the common electrode layer is formed on the planarizing layer 4 by a deposition process, and then the thin film to be formed as the common electrode layer is split into a plurality of patterned touch control sensing electrodes 7 (only one of them is illustrated in the figure) through a photoetching process. Thus, the plurality of touch control sensing electrodes 7 located in the same layer may function as the common electrode to display image, and the touch control sensing electrodes 7 are used for transferring the common voltage (Vcom) and the touch scan signal by time-sharing during a period of displaying one frame image.

In the step of S40, a first insulation layer 6 is formed on the planarizing layer 4 having the touch control sensing electrode 7. In this step, the first insulation layer 6 covers the touch control sensing electrodes 7 and the planarizing layer 4.

In the step of S50, a first via hole is disposed in the portions of first insulation layer 6 and the planarizing layer 4 corresponding to the thin film transistor 2. In this step, the first via hole is formed mainly through a photoetching process.

In the step of S60, a pixel electrode 3 is formed on the first insulation layer 6, and the pixel electrode 3 is electrically connected to the thin film transistor 2 through the first via hole. In this step, firstly, a thin film layer to be formed as the pixel electrode 3 is formed on the first insulation layer 6 by a deposition process, and then the patterned pixel electrode 3 is obtained through a photoetching process.

In the step of S70, a second insulation layer 8 is formed on the first insulation layer 6 having the pixel electrode 3, and a second via hole is disposed in the portions of the first and second insulation layer 6 and 8 corresponding to the touch control sensing electrode 7. The second insulation layer 8 covers the pixel electrode 3 and the first insulation layer 6, and the first via hole is formed by a photoetching process.

In the step of S80, a metal connection line 5 is formed on the second insulation layer 8, and the metal connection line 5 is electrically connected to the touch control sensing electrode 7 through the second via hole. In this step, firstly, a thin film layer to be formed as the metal connection line 5 is formed on the second insulation layer 8 by a deposition process, and then the patterned metal connection line 5 is obtained through a photoetching process.

Figure 5:
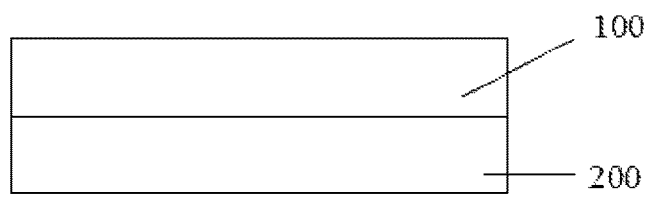
FIG. 5 is a schematic view illustrating the structure of a liquid crystal display provided by an embodiment of the present disclosure.

As illustrated in FIG. 5, the present embodiment further provides a liquid crystal display including the self-capacitance in-cell touch screen 100 and the back light module 200 disposed opposite to each other as mentioned above, wherein the back light module 200 provides the in-cell touch screen 100 with a light source used for displaying image so that the in-cell touch screen 100 may display images.

In conclusion, a self-capacitance in-cell touch screen is provided according to an embodiment of the present disclosure. The touch screen structure is disposed in the array substrate of the in-cell touch screen, and the touch screen structure includes the touch control sensing electrode, the first insulation layer, the second insulation layer and the metal connection line formed on the planarizing layer in sequence. Since the touch control sensing electrode has greater width and smaller thickness compared with the metal connection line, gases given off by the planarizing layer due to high temperature in the deposition process have less influences on the adhesion between the touch control sensing electrode and the planarizing layer, which resolves the problem of weak adhesion occurring when the metal connection line is prior formed in the prior art, thereby improving the quality of the product and reducing the production cost. In addition, the second insulation layer also isolates the metal connection line from the pixel electrode, so as to avoid occurrence of short circuit between the metal connection line and the pixel electrode.

It should be explained that the relationship terms, such as first and second, etc., in the description are only used to distinguish one substance or operation from another substance or operation, not necessarily used to require or imply any actual relation or sequence existing between these substances or operations. Moreover, the terms such as "include", "contain" or any other variant means covering instead of exclusively including, so that the process, method, object or device including a series of factors not only includes those factors but also includes other factors that are not explicitly listed, or it may further include inherent factors for such process, method, object or device. In the case of no more limitations provided, the factors defined by the sentence of "include one . . . " do not exclude additional identical factors existing in the process, method, object or device which includes the factors.

The above statements are only specific embodiments of the present disclosure, it should be pointed out that, to those ordinary skilled in the art, several improvements and modification can be made without departing from the principle of the present disclosure, and these improvements and modification should be considered as being included in the protection scope of the present disclosure.

What is claimed:

1. A self-capacitance in-cell touch screen comprising an array substrate which has a glass substrate, thin film transistors disposed on the glass substrate, and pixel electrodes electrically connected with the thin film transistors, a planarizing layer being disposed between the pixel electrodes and the thin film transistors, wherein a transparent touch control sensing electrode, a first insulation layer, a second insulation layer, and a metal connection line are disposed on the planarizing layer in sequence, and the metal connection line is electrically connected to the touch control sensing electrode through via holes disposed in the first insulation layer and the second insulation layer; wherein the first insulation layer extends to a position between the planarizing layer and the pixel electrode, and the second insulation layer extends to be located on the pixel electrodes which are electrically connected to the thin film transistors through a via hole disposed in the first insulation layer and the planarizing layer; and wherein the touch control sensing electrode is further configured as a common electrode to transfer a common voltage and a touch scan signal by time-sharing during a period of displaying one frame image.

2. The self-capacitance in-cell touch screen of claim 1, wherein each of the touch control sensing electrode and the pixel electrode is made of ITO, the planarizing layer is made of an organic material, and the metal connection line is made of a metal material.

3. The self-capacitance in-cell touch screen of claim 1, wherein each of the first and second insulation layers is made of $SiN_x$, $SiO_x$, or $SiN_xO_y$.

4. The self-capacitance in-cell touch screen of claim 1, wherein each of the thin film transistors comprises a source electrode, a drain electrode, a gate electrode, and an active layer, wherein the active layer is disposed on and connected to the glass substrate; the source electrode and the drain electrode are disposed on the same layer above the active layer; the gate electrode is above the source electrode and the drain electrode; a third insulation layer is disposed between the source and drain electrodes and the active layer; the source and drain electrodes are connected to the active layer through via holes disposed in the third insulation layer, respectively; and a fourth insulation layer is disposed between the source and drain electrodes and the gate electrode.

5. The self-capacitance in-cell touch screen of claim 4, wherein an ohmic contact layer is disposed between the active layer and the source and drain electrodes.

6. The self-capacitance in-cell touch screen of claim 4, wherein each of the third and fourth insulation layers is made of $SiN_x$, $SiO_x$, or $SiN_xO_y$.

7. The self-capacitance in-cell touch screen of claim 1, further comprising a color filter substrate disposed opposite to the array substrate and a liquid crystal layer interposed between the array substrate and the color filter substrate.

8. A method of manufacturing a self-capacitance in-cell touch screen comprising steps for manufacturing an array substrate, wherein a manufacturing process of the array substrate comprises:

S10, providing a glass substrate and manufacturing thin film transistors on the glass substrate;

S20, forming a planarizing layer on the glass substrate having the thin film transistors;

S30, forming transparent touch control sensing electrodes on the planarizing layer;

S40, forming a first insulation layer on the planarizing layer having the touch control sensing electrodes;

S50, disposing a first via hole in the portions of the first insulation layer and the planarizing layer corresponding to the thin film transistors;

S60, forming a pixel electrode on the first insulation layer, a pixel electrode being electrically connected to the thin film transistors through the first via hole;

S70, forming a second insulation layer on the first insulation layer having the pixel electrode and disposing a second via hole in the portions of the first and second insulation layers corresponding to the touch sensing electrode; and S80, forming a metal connection line on the second insulation layer, the metal connection line being electrically connected to the touch sensing electrodes through the second via hole.

9. The method of manufacturing the self-capacitance in-cell touch screen of claim 8, wherein each of the touch control sensing electrodes and the pixel electrode is made of ITO, the planarizing layer is made of an organic material, and the metal connection line is made of a metal material.

10. The method of manufacturing the self-capacitance in-cell touch screen of claim 8, wherein each of the first and second insulation layers is made of $SiN_x$, $SiO_x$, or $SiN_xO_y$.

11. A liquid crystal display comprising a liquid crystal display screen and a back light module disposed opposite to the liquid crystal display screen, wherein the back light module provides the liquid crystal display screen with a light source for displaying image;

wherein the liquid crystal display screen is a self-capacitance in-cell touch screen comprising an array substrate comprising a glass substrate, thin film transistors disposed on the glass substrate, pixel electrodes electrically connected with the thin film transistors, a planarizing layer being disposed between the pixel electrodes and the thin film transistors, wherein a transparent touch control sensing electrode, a first insulation layer, a second insulation layer, and a metal connection line are disposed on the planarizing layer in sequence, and the metal connection line is electrically connected to the touch control sensing electrode through via holes disposed in the first and second insulation layers; wherein the first insulation layer extends to a position between the planarizing layer and the pixel electrode, and the second insulation layer extends to be located on the pixel electrodes which are electrically connected to the thin film transistors through via holes disposed in the first insulation layer and the planarizing layer; and wherein the touch control sensing electrodes are further configured as common electrodes to transfer a common voltage and a touch scan signal by time-sharing during a period of displaying one frame image.

12. The liquid crystal display of claim 11, wherein each of the touch control sensing electrode and the pixel electrode is made of ITO, the planarizing layer is made of an organic material, and the metal connection line is made of a metal material.

13. The liquid crystal display of claim 11, wherein each of the first and second insulation layers is made of $SiN_x$, $SiO_x$, or $SiN_xO_y$.

14. The liquid crystal display of claim 11, wherein each of the thin film transistors comprises a source electrode, a drain electrode, a gate electrode, and an active layer, wherein the active layer is disposed on and connected to the glass substrate; the source and drain electrodes are disposed on the same layer above the active layer; the gate electrode is disposed above the source electrode and the drain electrode; a third insulation layer is disposed between the source and drain electrodes and the active layer; the source and drain electrodes are connected to the active layer through via holes disposed in the third insulation layer, respectively; and a fourth insulation layer is disposed between the source and drain electrode and the gate electrode.

15. The liquid crystal display of claim 14, wherein an ohmic contact layer is disposed between the active layer and the source and drain electrodes.

16. The liquid crystal display of claim 14, wherein each of the third and fourth insulation layers is made of $SiN_x$, $SiO_x$, or $SiN_xO_y$.

17. The liquid crystal display of claim 11, further comprising a color filter substrate disposed opposite to the array substrate and a liquid crystal layer disposed between the array substrate and the color filter substrate.

* * * * *